United States Patent
Owen et al.

(10) Patent No.: US 7,106,916 B1
(45) Date of Patent: Sep. 12, 2006

(54) METHOD FOR USING CONTROL SHEETS TO CONTROL SCANNING DEVICES

(75) Inventors: James Owen, Vancouver, WA (US); Mary Bourret, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/352,734

(22) Filed: Jul. 13, 1999

(51) Int. Cl.
*G06K 9/20* (2006.01)
*H04N 1/32* (2006.01)

(52) U.S. Cl. .................... 382/317; 382/312; 358/468
(58) Field of Classification Search ........ 382/305–317, 382/321, 266; 235/375; 358/1.15, 402, 358/404, 407, 468
See application file for complete search history.

(56) References Cited

U.S. PATENT DOCUMENTS

| 4,283,621 A | 8/1981 | Pembroke ............... 235/375 |
| 5,129,016 A | 7/1992 | Murakami et al. ......... 382/306 |
| 5,659,164 A | 8/1997 | Schmid ................. 235/375 |
| 6,426,806 B1 * | 7/2002 | Melen ................. 358/468 |

* cited by examiner

*Primary Examiner*—Duy M. Dang
(74) *Attorney, Agent, or Firm*—Michael Blaine Brooks, P.C.; Rosemarie F. Jones; David Ripma

(57) ABSTRACT

A method of controlling a scanning device using control sheets. The scan job is started and the control image is located. The control image is decoded, either as part of the locating step or part of a processing step. The output is created either after the processing step, where the output is created in accordance with the control instructions decoded from the control image, or prior to the processing of the control instruction.

19 Claims, 2 Drawing Sheets

METHOD FOR USING CONTROL SHEETS TO CONTROL SCANNING DEVICES

BACKGROUND OF THE INVENTION

1. Field of the Invention

This invention relates to control of scanning devices, more particularly to using control sheets to control these devices.

2. Background of the Invention

The increased availability of scanning devices in the office environment has led to methods to increase their convenience. Scanning devices include any device that has the capability to scan, such as fax machines, copiers, scanners, etc. One of these methods is the use of control sheets in scanning devices to direct the scanner operation. A control sheet typically includes some type of codes or instructions that can be interpreted by the scanning engine on the scanning device.

One example of such a method is found in U.S. Pat. No. 5,659,164, issued Aug. 19, 1997. In this method, a control sheet is inserted into the scanning job at the beginning of the job. Several jobs can be stacked together, but the control sheet must be first for any given job. The control sheet has machine-readable coded instructions, referred to as MRI, that direct the scanner in certain operations. The control sheet can direct settings for the scanner, or routing of the scan job to recipients across a network.

However, two shortcomings in this approach become apparent upon further study. First, having to place the control sheet first may be inconvenient. The user may have forgotten the control sheet until the scanning job has already started, or it may be out of order. The time and processing used to complete that particular scan job has then been wasted. It will have to be repeated with the control sheet in the proper place. Further, for some applications, putting the control information first may be impractical.

Second, use of machine-readable code can be awkward and time consuming. In order for the user to produce control sheets with the machine-readable code, the desired operations must be entered into a converter and the resulting code placed on the control sheet. It would seem far more convenient if the user could type or even hand print the instructions on a control sheet and then use that sheet instead of having to convert it. Furthermore, other applications would be possible if the control instructions are not held to the machine-readable format.

Therefore, a method is needed that allows the control sheets to be placed anywhere within a scanning job, such as a fax, copy or scan job, and that can use formats other than machine readable code.

SUMMARY OF THE INVENTION

An aspect of the invention is a method for controlling scanning devices using control sheets. The method includes the steps of starting the scanning job, locating the control image, processing the control image and creating output in accordance with the control image. Alternative embodiments include creating output prior to processing the control image. The scanning job could be one of image acquisition, such as scanning documents for e-mail or OCR analysis, or one of image production, such as faxing or copying.

In alternative embodiments, the control image could be text, such as a typed or handwritten cover sheet, or an identification badge, or numbers as in an employee number or credit card number. The control image could also be in machine-readable code.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
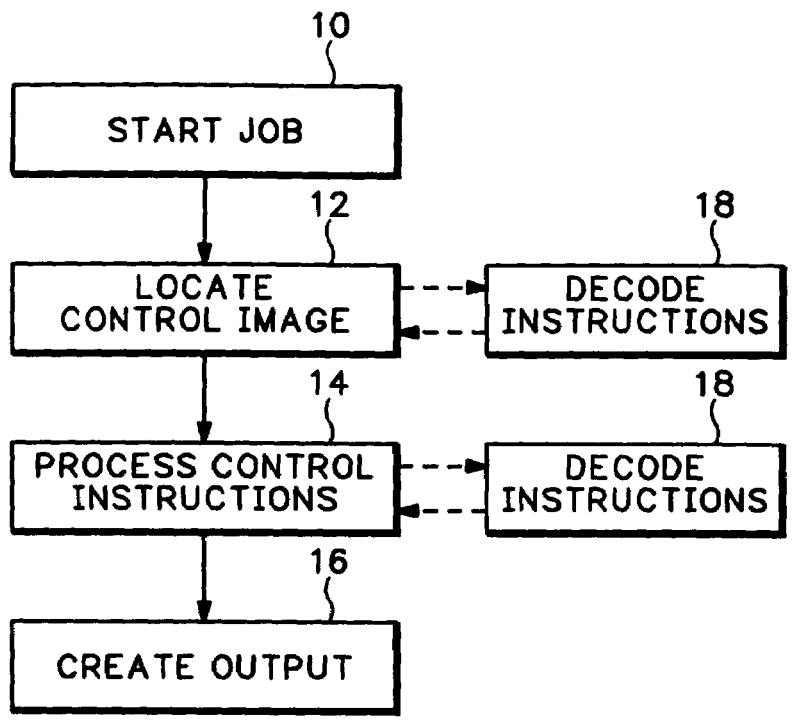
FIG. 1 shows one embodiment of a method to control scanning devices with the use of control sheets, in accordance with the invention.

FIG. 1 shows one embodiment of a process for controlling imaging devices with control sheets. In step 10, the scan job is started. The scan job could be one of several types of jobs. For example, it could be a fax request with the scanned documents to be faxed to several recipients. Other options could be a scanner from which the scanned documents are to be sent across the network to several recipients' e-mail, or a copier with directions on the formatting of the paper output directed by the control sheets.

Scanning jobs that result in an electronic image being acquired as the end result, such as in scanning a document for e-mail, for optical character recognition analysis, will be referred to as image acquisition tasks. Scanning jobs where the electronic image is merely a step before producing a hard copy result, such as copying or faxing, will be referred to as image production tasks.

Control sheets can save considerable amounts of time. If a user has a monthly report that is a compilation of several documents, that user could create one control sheet with all the routing information on it. Every month, the user would just include the control sheet in the stack of documents and the monthly report will get routed appropriately.

Once the documents are scanned, the method locates the control image in step 12. In this manner, the location of the control image is not set to be at the beginning of the job. The capability of locating the control image is provided at the scanning device, alleviating the problem of out of order or forgotten control sheets. Also, for some applications, which will be discussed in more detail later in the discussion, it may be easier to process the information from the control image after the scanning of the documents is completed.

For the example in FIG. 1, the control instructions are processed prior to creating the output. In either step 12 or step 14, the decoding of the instructions at step 18, may be included. Decoding the instructions may be done immediately upon location of the image, or at the point when the instructions are going to be executed. There is no limitation in the invention as to when this step occurs. Finally, in the example of FIG. 1, the output is created in step 16 in accordance with the control instructions.

Figure 2:
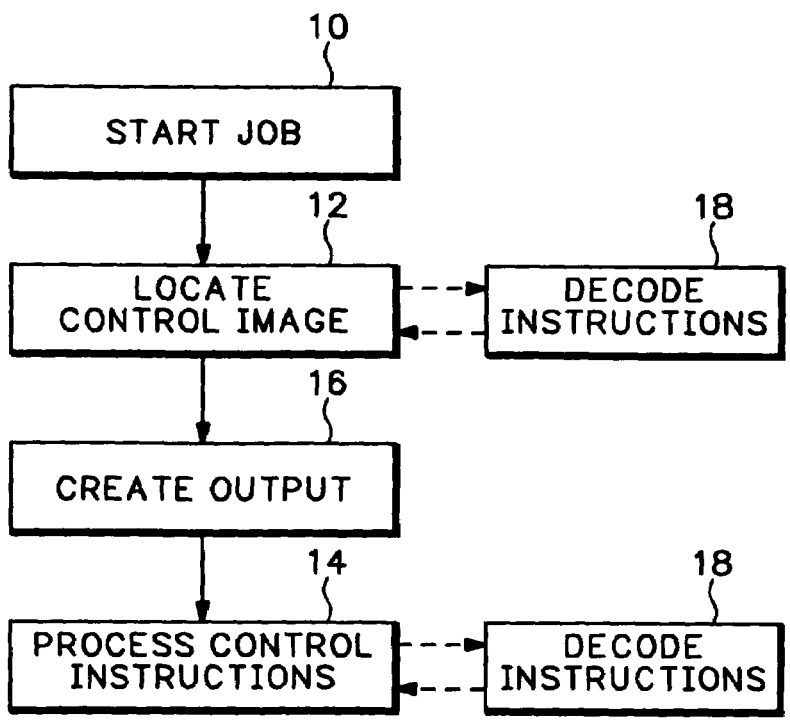
FIG. 2 shows an alternative embodiment of a method to control scanning devices with the use of control sheets, in accordance with the invention.

In the example of FIG. 2, an alternative embodiment is disclosed. The first two steps of the process are the same as those in FIG. 1. However, in this case the output is created prior to the control instructions being processed. Again, as was discussed relative to FIG. 1, the decoding step 18, can be performed either as part of step 12 or as part of step 14.

In this example, as mentioned above, it may be more practical to produce the output prior to processing the control instructions. For example, it has become common for companies to track use of copiers shared by several departments so the overhead for the copier can be divided fairly among the departments.

The user would scan their documents in using the copier and create the output. The control image would then be something like an identification card that the employee could lay on the platen. The copier would then process the control instructions, comprising of the employee's name and possibly their department, and then charge that job to that department. Other examples could include credit card images used to bill copies at copy shops, or other forms of user identification. These examples are not restricted to the method as shown in FIG. 2, but are equally applicable to the methods of FIG. 1, but are merely used to further explain the alternative embodiment.

Figure 3:
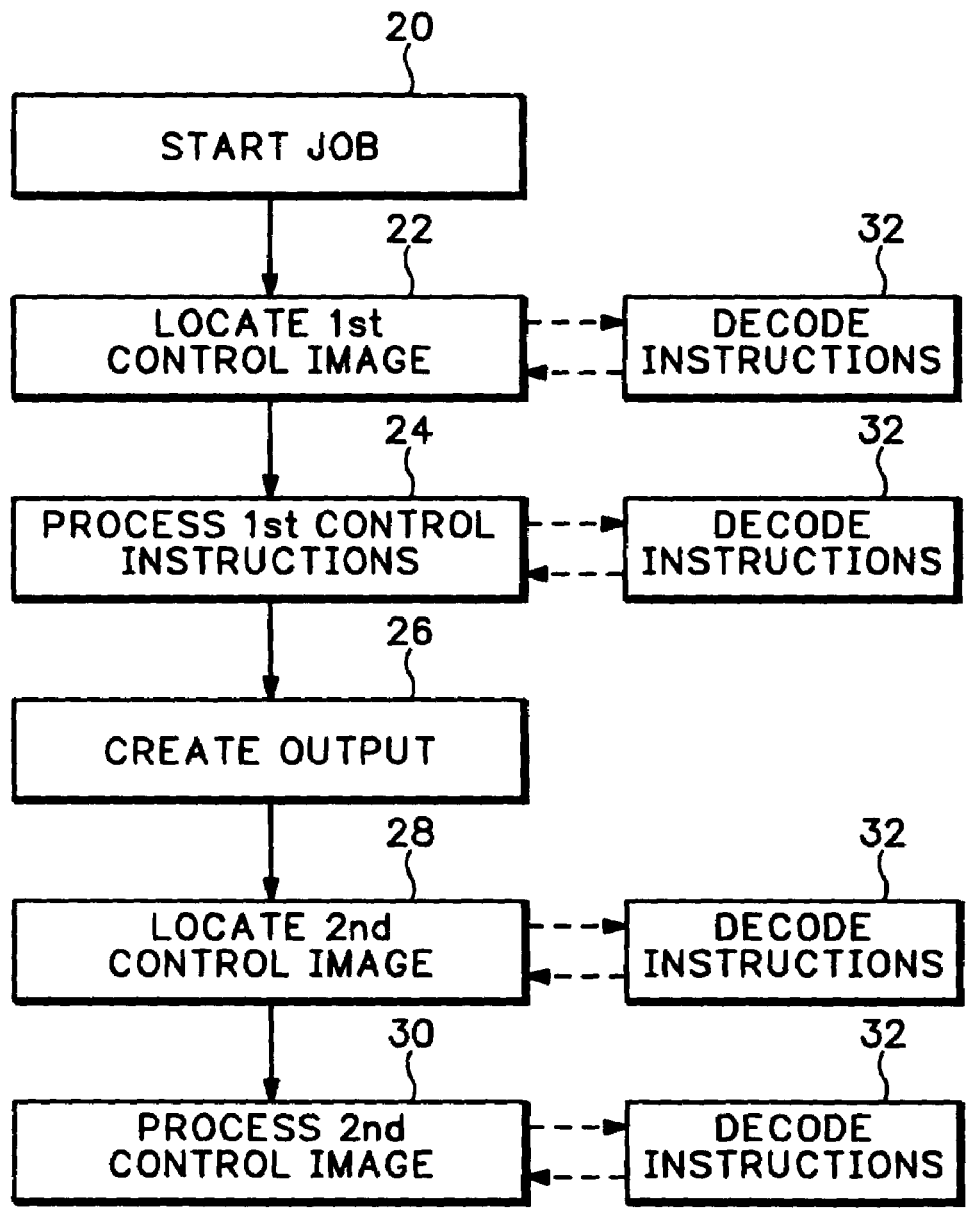
FIG. 3 shows an alternative embodiment of a method to control scanning devices with the use of control sheets, in accordance with the present invention.

A second alternative embodiment is shown in FIG. 3. In this embodiment, two different types of control sheets are used. For example, a first control sheet could be a set of directions to operate the scanning device. In this embodiment, the job is started at step 20. The first control image, which could be the directions given in the above example, among other things, is located at step 22. Again, as with the examples of FIGS. 1 and 2, the image of the control sheet can be processed to decode the instructions at this point or just prior to processing, both referred to as step 32. The first set of control instructions is processed at step 24.

In this example, the first set of control instructions is assumed to be the directions for operation of the scanning device. However, this is not intended to limit the application of the invention. The two sets of control images could be inserted into the scanning job simultaneously, or other options for the control images could be used first. However, for discussion purposes, the first control sheet will be assumed to be the operating instructions. The output would then be produced in step 26.

After creation of the output, the process could then move to step 28 and locate the second control image. The second control image could be an identifier for the user, a credit card number, etc. The second control image is then processed. Again, similar to the other instances of the control image decoding, it could be done as part of the location step or as part of the processing step.

As mentioned above, the order of the types of control sheets could be reversed. Alternatively, they could be inserted simultaneously. For example, the first control image could be the credit card or identification image. This is then processed and that allows the second control image to be processed, which is the operating instructions for the scanning device.

Other examples of control instructions could be network routing directions, phone numbers for faxing documents, settings for the scanner or copier, such as to perform optical character recognition (OCR), create sorted, stapled or duplex copies, etc. The format of the control instructions can vary as well, within application of the invention.

If the control instructions are in the form of machine-readable code, it will be fairly simple for the scanning engine to locate and decode the control instructions. However, as previously mentioned, this could be inconvenient. The control instructions could be typed or written on the control sheet. The scanning device would then have the capability to perform OCR analysis on the control sheet and parse the instructions into machine instructions for operating the device. Typically, some type of registration mark or other identification would have to be made on the control sheet to separate it from the other pages of text in the scanning job.

The method described in U.S. Pat. No. 5,659,164 describes OCR as one of the operations performable by the scanning device. However, it does not mention OCR analysis of the control sheet itself, only as one of the operations on the scanned documents. This could even be extended to recognize hand written instructions, such much as certain devices can be "trained" to recognize handwriting, such as the PalmPilot™. Additionally, the analysis could include analyzing numbers such as credit card numbers, or text as in identification badges, as mentioned above.

Thus, although there has been described to this point a particular embodiment for a method for controlling a scanning device with control sheets, it is not intended that such specific references be considered as limitations upon the scope of this invention except in-so-far as set forth in the following claims.

What is claimed is:

1. A method for controlling imaging devices, the method comprising:

scanning a stack comprising a first sheet, at least one middle sheet, and a last sheet, wherein the at least one middle sheet is interposed between the first sheet and the last sheet, wherein the at least one middle sheet comprises a control sheet associated with the stack and the at least one middle sheet comprises a control sheet comprising a control image, and wherein the control image comprises at least one control instruction;

locating the control image on the at least one control sheet;

producing output based on the stack of sheets;

processing the at least one control instruction and using the at least one control instruction for processing the output.

2. The method of claim 1 wherein the scanning step is a copying step.

3. The method of claim 1 wherein the output is a result of an image acquisition task.

4. The method of claim 1 wherein the output is a result of an image production task.

5. The method of claim 1 wherein the producing step is performed after the processing step.

6. The method of claim 1 wherein the producing step is performed before the processing step.

7. The method of claim 1 wherein the control image is in machine-readable format.

8. The method of claim 1 wherein the control image is text.

9. The method of claim 1 wherein the control image is numbers.

10. The method of claim 1 wherein the at least one control instruction comprises operating instructions.

11. The method of claim 1 wherein the method further comprises locating a second control sheet comprising a second control image, wherein the second control image comprises at least one control instruction, and the second control sheet is associated with the stack.

12. A method for controlling imaging devices, the method comprising:

scanning a stack comprising a plurality of sheets, wherein the plurality of sheets comprises two control sheets located at two different locations within the stack, wherein each control sheet comprises a control image comprising at least one control instruction and wherein each control sheet is associated with the stack;

locating each of the control image on the two control sheets;

producing output based on the stack;

processing each of the control instruction from the control image and using at least one of the control instructions for processing the output.

13. The method of claim 12 wherein the scanning step is a copying step.

14. The method of claim 12 wherein the output is a result of an image acquisition task.

15. The method of claim 12 wherein the output is a result of an image production task.

16. The method of claim 12 wherein the producing step is performed after the processing step.

17. The method of claim 12 wherein the producing step is performed before the processing step.

18. The method of claim 12 wherein at least one of the control images of the two control sheets is in machine-readable format.

19. The method of claim 12 wherein at least one of the control images of the two control sheets is numbers.

* * * * *